Oct. 20, 1936.  J. C. McCUNE  2,058,029
BRAKE VALVE DEVICE
Filed Sept. 19, 1935  2 Sheets-Sheet 1
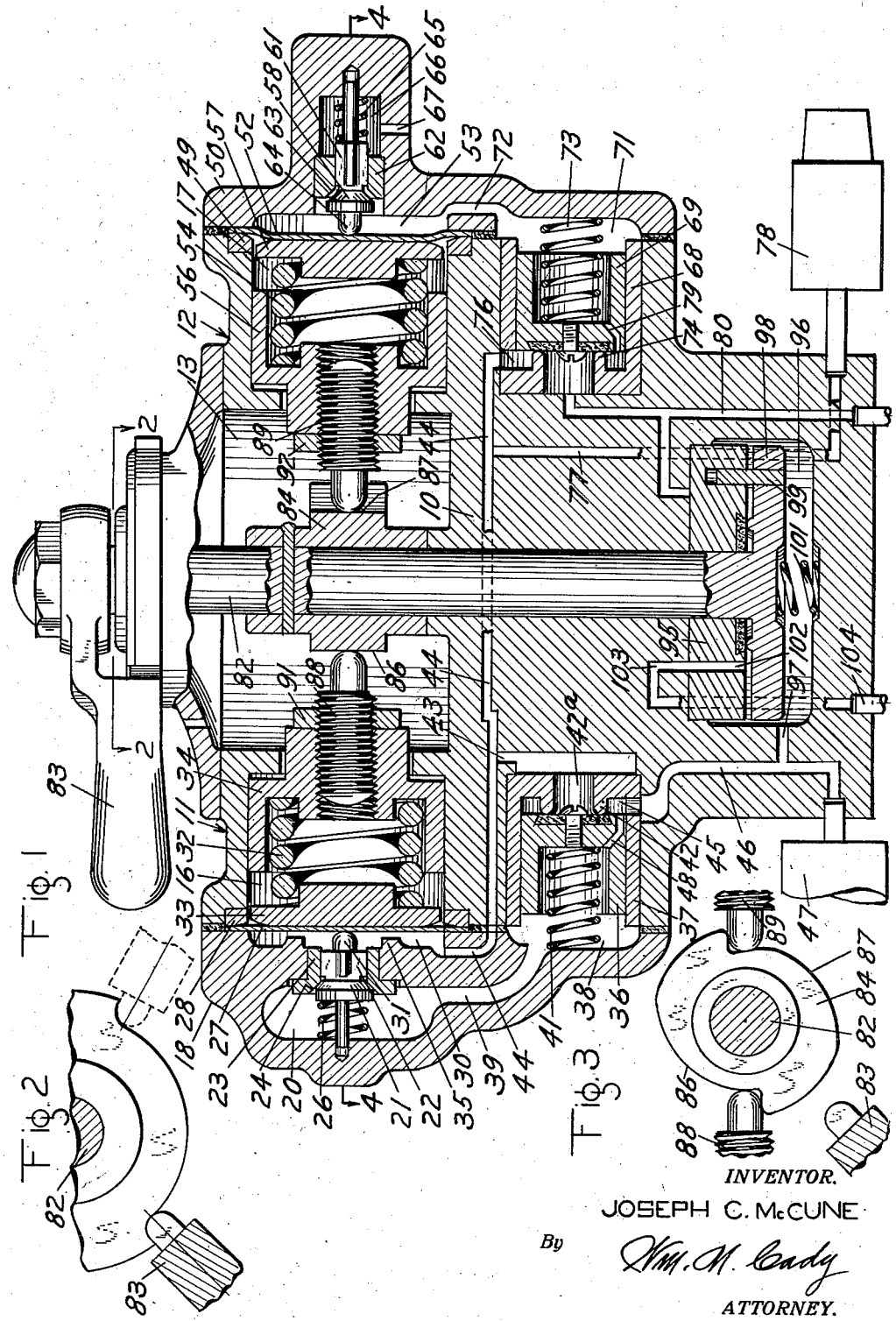
INVENTOR.
JOSEPH C. McCUNE
By Wm. M. Cady
ATTORNEY.

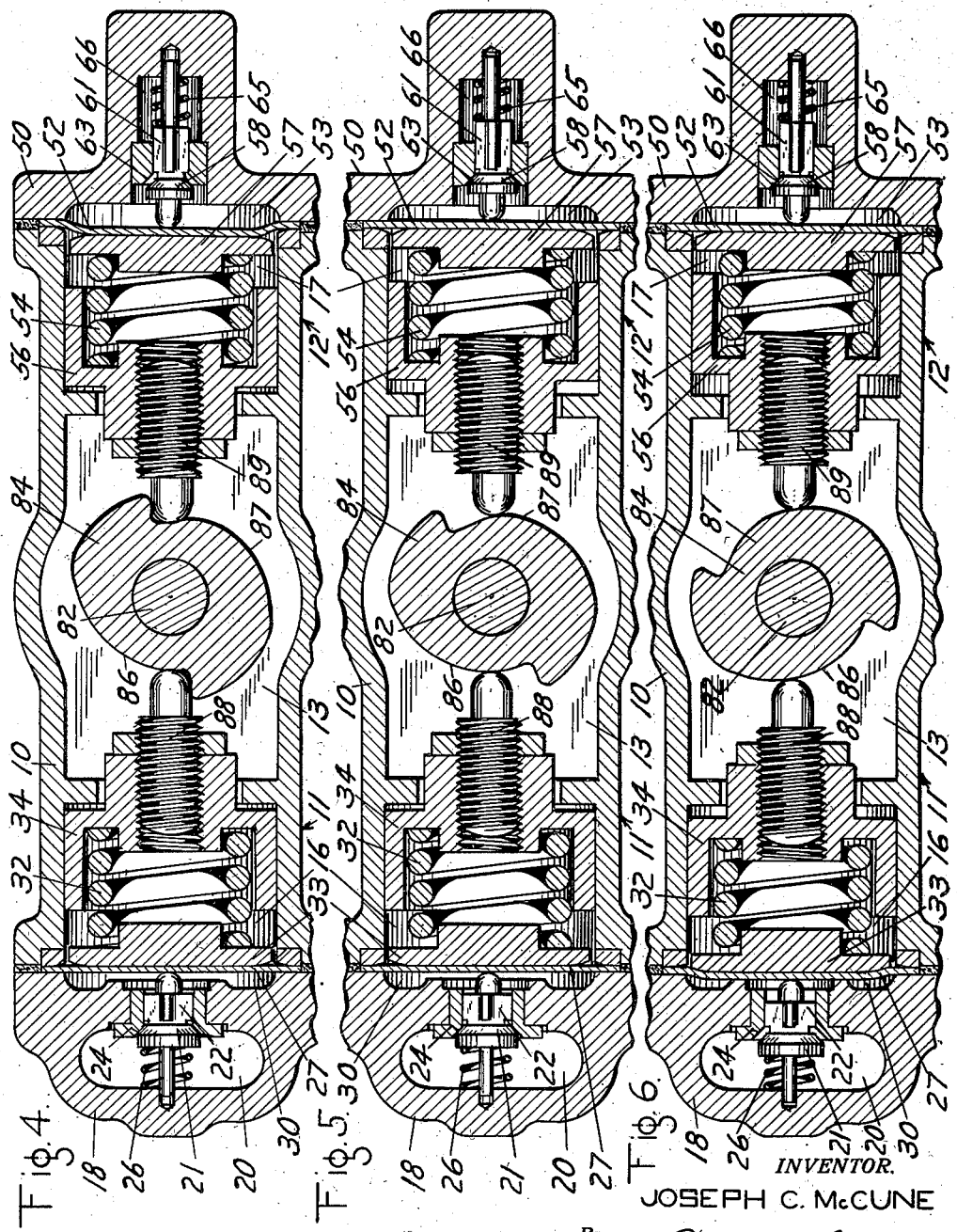

Patented Oct. 20, 1936

2,058,029

UNITED STATES PATENT OFFICE 2,058,029

BRAKE VALVE DEVICE

Joseph C. McCune, Edgewood, Pa., assignor to The Westinghouse Air Brake Company, Wilmerding, Pa., a corporation of Pennsylvania Application September 19, 1935, Serial No. 41,264

14 Claims. (Cl. 303—54)

This invention relates to fluid pressure brakes, and more particularly to a brake valve device for a fluid pressure brake.

The principal object of the invention is to provide an improved self-lapping brake valve device, having high sensitivity and rapidity of action, and quickly operative in response to manipulation of the brake valve handle through an application and release zone to supply or release fluid under pressure to or from the brake system, automatically maintaining the desired pressure as predetermined by the position to which the handle is moved.

A further object of the invention is to provide an improved self-lapping brake valve device.

In the accompanying drawings, Fig. 1 is a detailed view mainly in section of a brake valve device constructed according to the invention; Fig. 2 is a sectional view of a portion of the brake valve handle quadrant taken on the line 2—2 of Fig. 1; Fig. 3 is a fragmentary plan view of the cam mechanism showing the position of the handle relative thereto; and Figs. 4, 5, and 6 are sectional views taken on the line 4—4 of Fig. 1, showing three stages, respectively, in the operation of the brake valve device.

As shown in the drawings, the brake valve device comprises a casing 10 having oppositely disposed application and release portions 11 and 12, said portions being separated in part by a central chamber 13, which communicates on the one side with a spring chamber 16 in said application portion and on the opposite side with a similar spring chamber 17 in said release portion.

An end plate 18 is secured to the outer end of the application portion 11 and has a valve chamber 20 containing a pilot valve 21, the fluted stem 22 of which is movably mounted in a bushing 23 carried in said end plate. A valve seat 24 is formed on said bushing, the pilot valve being normally urged into engagement with said seat by a spring 26. A flexible diaphragm 27, adapted to operate the pilot valve 21, is clamped between the end plate 18 and a ring 28, countersunk into the casing wall of the spring chamber 16, said diaphragm forming on the outer side a pressure chamber 30 into which a rounded end 31 of the valve stem 22 projects to engage the center of said diaphragm. A metering spring 32 is disposed in the spring chamber 16 and extends between a follower 33 which engages the inner side of the diaphragm and a plunger 34 slidably mounted in said spring chamber, while a stop 35 is provided on the end plate 18 for limiting outward movement of said diaphragm by the spring.

A supply valve piston 36 is slidably mounted in a bushing 37 carried in the application portion 11, said valve having on one side a chamber 38 connected through a passage 39 in the end plate to the valve chamber 20. A spring 41 disposed in the chamber 38 urges the valve piston into engagement with an annular seat rib 42, formed on the bushing 37 for controlling communication between a chamber 45 and a chamber 42ᵃ within the seat rib 42, which chamber is connected through a passage 42 and a passage 44 to the pressure chamber 30. The chamber 45, to which only the outer seated area of the valve piston is normally exposed, is connected through a passage 46 to a main reservoir 47, a restricted port 48 being provided in the valve piston 36 for connecting the chamber 45 with the chamber 38.

Interposed between a ring 49 countersunk in the outer end of the release portion 12 and an end plate 50 secured thereto is a flexible diaphragm 52, having on one side a pressure chamber 53 and on the other side the spring chamber 17, which contains a metering spring 54 which extends between a plunger 56 and a follower 57 engaging said diaphragm. The metering spring 54 is substantially of the same size and compression value as the metering spring 32. A pilot valve 58 having a fluted stem 61 is mounted in a bushing 62 secured in the end plate 50, a seat 63 being formed on the bushing for receiving said valve. A rounded end 64 is provided on the end of the pilot valve 58 and is maintained in operative engagement with the diaphragm by a spring 65 disposed in a chamber 66 and acting against the valve stem 61, said spring normally urging said valve away from the seat 63. The chamber 66 is open to the atmosphere through a passage 67.

Slidably mounted in a bushing 68 is a release valve piston 69 having on one side a chamber 71 connected through a passage 72 with the chamber 53. A spring 73 is disposed in the chamber 71 for urging the valve piston into engagement with an annular seat rib 74 provided on the bushing, the outer seated area of said valve piston being exposed to a chamber 76 which is connected to the passage 44 and thence by way of a passage 77 to a brake cylinder 78. The valve piston 69 has a restricted passage 79 through which the chambers 71 and 76 are connected, and the valve piston 69 is adapted to control communication between the chamber 76 and an atmospheric exhaust passage 80 which communicates with the area inwardly of the seat rib 74.

Journaled in the casing 10 and disposed on a medial line between the application portion 11 and the release portion 12, is an operating shaft 82, which is adapted to be rotated by means of a handle 83. A cam 84, having opposite cam faces 86 and 87, is secured to the shaft 82 within the central chamber 13 in axial alignment with the plungers 34 and 56. The cam face 86 operatively engages the end of an adjustable tappet 88 having screw-threaded connection to the plunger 34, while the opposite cam face 87 operatively engages the end of a similar tappet 89 having screw-threaded connection to the plunger 56, lock nuts 91 and 92 being fitted on said tappets 88 and 89, respectively. It will be noted that by reason of the location of the cam 84 between the axially aligned tappets 88 and 89, frictional resistance to rotation of the shaft 82 is minimized.

In order that the brake valve device may be employed in a brake system in which an emergency application of the brakes is effected by reducing the pressure of fluid in a supplementary or emergency pipe normally charged with fluid under pressure, a rotary valve 95 is provided in a valve chamber 96, which is formed in the lower part of the casing 10 and is connected to the main reservoir 47 by way of a passage 97 and the passage 46. The rotary valve is supported by an enlarged end 98 of the operating shaft 82, being secured thereto by means of a pin 99, and is maintained in engagement with its seat by the upward pressure of a spring 101 disposed between the shaft end 98 and the bottom of the valve chamber 96.

In operation, with the brake valve device in release position as shown in Figs. 1 and 4 of the drawings, fluid under pressure supplied to the main reservoir 47 in the usual manner flows through the passage 46 to the chamber 45, and thence through the restricted passage 48 in the valve piston 36 to the chamber 38, and by way of the passage 39 to valve chamber 20. Fluid at main reservoir pressure is also supplied through the passage 97 to the valve chamber 96, and thence through a port 102 in the rotary valve 95 and a passage 103 to the usual emergency pipe 104, charging said pipe with fluid under pressure.

With the cam 84 in the release position as shown in Fig. 4 of the drawings the plunger 56 is permitted to move inwardly so that when the spring 54 expands to its full length it is not long enough to move diaphragm 52 to a position to close the valve 58, and this valve will therefore be maintained in the open position by the spring 65.

The brake cylinder 78 therefore is open to the atmosphere through the passages 77 and 44, chamber 76, restricted passage 79, chamber 71, passage 72, chamber 53, past the pilot valve 58, and through the chamber 66 and passage 67.

When it is desired to effect an application of the brakes, the brake valve handle 83 is moved so as to rotate the shaft 82 and cam 84 in a counterclockwise direction, as viewed in Figs. 4 to 6, the initial movement turning said members to the position shown in Fig. 5. It will be noted that the initial contour inclination of the cam face 87 is slightly in advance of that of the cam face 86, so that the movement of the cam 84 first forces the tappet 89 engaging said cam face 87 toward the right, and through the medium of the plunger 56, spring 54, follower 57 and diaphragm 52, closes the pilot valve 58, overcoming the pressure of the spring 65.

The atmospheric connection from the brake cylinder having thus been cut off, continued movement of the brake valve handle rotates the shaft 82 and cam 84 to a service application position, such as that shown in Fig. 6, wherein the cam faces 86 and 87 bear against the tappets 88 and 89 respectively, further shifting said tappets in opposite directions. The outward movement of the tappet 89 causes the plunger 56 to compress the spring 54, the follower 57 and diaphragm 52 being held stationary by the seated pilot valve 58, while the opposite movement of the tappet 88 forces the plunger 34, spring 32, follower 33 and diaphragm 27 outwardly, so that said diaphragm unseats the pilot valve 21 and engages the stop 35.

With the pilot valve 21 unseated, fluid under pressure is discharged from the connected chambers 20 and 38, past said valve at a relatively rapid rate, and through chamber 30, passage 44 and passage 77 to the brake cylinder 78. Since the flow through the restricted passage 48 is slow, the consequent sudden reduction in the pressure in chamber 38 permits the valve piston 36 to be moved away from the seat rib 42, and fluid under pressure is then supplied from the main reservoir 47 through the passage 46, chambers 45 and 42a, and passages 43, 44 and 77 to the brake cylinder 78, effecting a service application of the brakes. At the same time, fluid under pressure flows through the passage 44 to the chamber 31 and past the unseated pilot valve 21 to the chambers 20 and 38 in the application portion 11, and also flows through said passage to the chamber 76 in the release portion 12 and thence through the restricted passage 79 in the valve piston 69 to the chamber 71, and by way of the passage 72 to the chamber 53.

When the pressure of fluid in the chamber 30 acting against the diaphragm 27 has been increased to a degree sufficient to overcome the opposing pressure of the spring 32, said diaphragm is moved inwardly, permitting the spring 26 to close the pilot valve 21. With the outlet from the connected chambers 20 and 38 thus closed the fluid pressures on opposite sides of the valve piston 36 are equalized by flow through the restricted passage 48, and the spring 41 then moves said valve piston to its seat, cutting off further flow of fluid under pressure to the brake cylinder.

Fluid which is supplied to the passage 44 leading to the brake cylinder, also flows to the chamber 76 outwardly of the seat rib 74. Fluid supplied to the chamber 76 flows through the restricted passage 79 to the chamber 71 and therefrom by way of the passage 72 to the chamber 53 and establishes a pressure in the chambers 53 and 71 substantially equal to the pressure which is established in the brake cylinder. As the pressures on opposite sides of the valve piston 69 are substantially equal this valve piston will be maintained in engagement with its seat by the spring 73.

Fluid at this pressure in the chamber 53 acting on the diaphragm 52 will not move the diaphragm 52 against the spring 54 as this spring has been compressed to a slightly greater degree than the spring 32, and the spring 32 will permit the valve 21 to close and cut off the supply of fluid to the brake cylinder before the pressure of the fluid supplied to the brake cylinder, and to the chamber 53, increases to a value high enough to overcome the spring 54.

If it is desired to reduce brake cylinder pressure to effect a partial release of the brakes, the brake valve handle 83 is moved so as to rotate the cam 84 in a clockwise direction, as viewed in Figs. 4 to 6 of the drawings, thereby permitting the tappet 88 to be shifted to the right under the combined pressures of the fluid acting against the diaphragm 27 and of the spring 32, while permitting the tappet 89 to be moved to the left by the combined pressures of fluid acting against the diaphragm 52 and of the spring 54. The inward movement of the diaphragm 52 permits spring 65 to unseat the pilot valve 58, thus venting fluid under pressure at a rapid rate from the connected chambers 53 and 71 to atmosphere by way of chamber 66 and passage 67. The sudden reduction of fluid pressure in the chamber 71 then permits the fluid pressure acting in the chamber 76 to unseat the valve piston 69, whereupon fluid under pressure is quickly discharged from the brake cylinder 76 through passages 77 and 44, chamber 76, and passage 80 to the atmosphere.

When the pressure of fluid in the chamber 53 has been reduced sufficiently, the metering spring 54 moves the diaphragm 52 and pilot valve 58 outwardly until said valve engages the seat 63, thereby closing the outlet from the connected chambers 71 and 73 so as to permit fluid under pressure to build up in said chambers by flow from the chamber 76 through the restricted passage 79, until the spring 73 is enabled to move the release valve piston 69 to its seat, thus checking further reduction of brake cylinder pressure.

To effect a full release of the brakes, the brake valve handle is moved to release position, in which the cam 84 permits full convergent movement of the tappets 88 and 89 and the respective plungers, thus releasing both metering springs. The pilot valve 58 and the valve piston 69 are then operated as hereinbefore described to release fluid under pressure from the brake cylinder, except that said pilot valve now remains unseated, there being no pressure opposing that of spring 65, so that a complete reduction of brake cylinder pressure is effected, communication from said brake cylinder being maintained open in release position by way of the passages 74 and 44, chamber 76, restricted passage 79 in the valve piston 69, chamber 71, passage 72, chamber 53, past the unseated pilot valve and thence through chamber 66 and passage 67. If any fluid under pressure remains in the brake cylinder after the valve piston 69 is moved to its seat by the spring 73 it may escape to the atmosphere past the pilot valve 58.

It will be apparent that my invention provides a self-lapping brake valve device embodying improvements in construction and arrangement of the parts, and which is extremely sensitive so as to respond rapidly to manipulation by the operator for gradually applying and releasing the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake cylinder, a brake valve device for controlling the supply of fluid under pressure to and from the brake cylinder, said brake valve device comprising a supply valve means operable upon a reduction in the fluid pressure in a chamber for supplying fluid under pressure to the brake cylinder, a release valve means operable upon a reduction in the fluid pressure in another chamber for releasing fluid under pressure from the brake cylinder, a valve for venting fluid from said supply valve chamber, a spring, a movable abutment subject to the opposing pressures of said spring and the brake cylinder for operating said valve, a valve for venting fluid from said release valve chamber, a spring, a movable abutment subject to the opposing pressures of the last-named spring and the brake cylinder for operating the last-named valve, and manually operable means for varying the force exerted by said springs on said abutments.

2. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, a valve controlled by said abutment and controlling a communication through which fluid may be released from said chamber, a movable abutment subject to the opposing pressures of a spring and of the fluid in a chamber, valve means subject to the opposing pressures of the fluid in said last named chamber and of the fluid in the brake cylinder and operative on a reduction in the pressure of the fluid in said chamber to open a communication through which fluid may be released from the brake cylinder, valve means controlled by said last-named abutment and controlling a passage through which fluid may be released from the chamber associated therewith, and common means to vary the force exerted by said springs on said abutments.

3. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, means to supply fluid to said chamber at a restricted rate, a valve controlled by said abutment and controlling a communication through which fluid may be released from said chamber, a movable abutment subject to the opposing pressures of a spring and of the fluid in a chamber, valve means subject to the opposing pressures of the fluid in said last-named chamber and of the fluid in the brake cylinder and operative on a reduction in the pressure of the fluid in said chamber to open a communication through which fluid may be released from the brake cylinder, valve means controlled by said last-named abutment and controlling a passage through which fluid may be released from the chamber associated therewith, and common means to vary the force exerted by the springs on said abutments.

4. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, means to supply fluid from the supply passage to said chamber at a restricted rate, a valve controlled by said abutment and controlling a communication through which fluid may be released from said chamber, a movable abutment subject to the opposing pressures of a spring and of the fluid in a chamber, valve means subject to the opposing pressures of the fluid in said last-named chamber and of the fluid in the brake cylinder and operative on a reduction in the pressure of the fluid in said chamber to open a communication through which fluid may be released from the brake cylinder, valve means controlled by said last-named abutment and controlling a passage through which fluid may be released from the chamber associated therewith, and common means to vary the force exerted by the springs on said abutments.

5. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, a valve controlled by said abutment and controlling a communication through which fluid may be released from said chamber to the brake cylinder, a movable abutment subject to the opposing pressures of a spring and of the fluid in a chamber, valve means subject to the opposing pressures of the fluid in said chamber and of the fluid in the brake cylinder and operative on a reduction in the pressure of the fluid in said last-named chamber to open a communication through which fluid may be released from the brake cylinder, valve means controlled by said last-named abutment and controlling a passage through which fluid may be released from the chamber associated therewith, and common means to vary the force exerted by said springs on said abutments.

6. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, means to supply fluid to said chamber at a given rate, a valve controlled by said abutment and controlling a communication through which fluid may be released from said chamber at a more rapid rate than said given rate, a movable abutment subject to the opposing pressures of a spring and of the fluid in a chamber, valve means subject to the opposing pressures of the fluid in said chamber and of the fluid in the brake cylinder and operative on a reduction in the pressure of the fluid in said last-named chamber to open a communication through which fluid may be released from the brake cylinder, valve means controlled by said last-named abutment and controlling a passage through which fluid may be released from the chamber associated therewith, and common means to vary the force exerted by said springs on said abutments.

7. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, a valve controlled by said abutment and controlling a communication through which fluid may be released from said chamber, a movable abutment subject to the opposing pressures of a spring and of the fluid in a chamber, means to supply fluid under pressure to said last-named chamber from a passage communicating with the brake cylinder, valve means subject to the opposing pressures of the fluid in said chamber and of the fluid in the brake cylinder and operative on a reduction in the pressure of the fluid in said last-named chamber to open a communication through which fluid may be released from the brake cylinder, valve means controlled by said last-named abutment and controlling a passage through which fluid may be released from the chamber associated therewith, and common means to vary the force exerted by said springs on said abutments.

8. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, a valve controlled by said abutment and controlling a communication through which fluid may be released from said chamber, a movable abutment subject to the opposing pressures of a spring and of the fluid in a chamber, means to supply fluid under pressure at a restricted rate to said last-named chamber from a passage communicating with the brake cylinder, valve means subject to the opposing pressures of the fluid in said chamber and of the fluid in the brake cylinder and operative on a reduction in the pressure of the fluid in said last-named chamber to open a communication through which fluid may be released from the brake cylinder, valve means controlled by said last-named abutment and controlling a passage through which fluid may be released from the chamber associated therewith, and common means to vary the force exerted by said springs on said abutments.

9. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, a valve controlled by said abutment and controlling a communication through which fluid may be released from said chamber, a movable abutment subject to the opposing pressures of a spring and of the fluid in a chamber, valve means subject to the opposing pressures of the fluid in said chamber and of the fluid in the brake cylinder and operative on a reduction in the pressure of the fluid in said last-named chamber to open a communication through which fluid may be released from the brake cylinder, and valve means controlled by said last-named abutment and controlling a passage through which fluid may be released from the chamber associated therewith to the atmosphere.

10. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, a valve controlled by said abutment and controlling a communication through which fluid may be released from said chamber, a movable abutment subject to the opposing pressures of a spring and of the fluid in a chamber, means to supply fluid under pressure at a restricted rate to said last-named chamber from a passage communicating with the brake cylinder, valve means subject to the opposing pressures of the fluid in said chamber and of the fluid in the brake cylinder and operative on a reduction in the pressure of the fluid in said last-named chamber to open a communication through which fluid may be released from the brake cylinder, and valve means controlled by said last-named abutment and controlling a passage through which fluid may be released from the chamber associated therewith at a more rapid rate than the rate at which fluid is supplied thereto.

11. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, a valve controlled by said abutment and operated to release fluid from said chamber on movement of the abutment by said spring, a movable abutment subject to the opposing pressures of a spring and of the fluid in a chamber, valve means subject to the opposing pressures of the fluid in said chamber and of the fluid in the brake cylinder and operative on a reduction in the pressure of the fluid in said last-named chamber to open a communication through which fluid may be released from the brake cylinder, valve means controlled by said last-named abutment and controlling a passage through which fluid may be released from the chamber associated therewith, and common means to vary the force exerted by said springs on said abutments.

12. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, a valve controlled by said abutment and controlling a communication through which fluid may be released from said chamber and operated to cut off the release of fluid from the chamber on movement of the abutment by fluid supplied to the brake cylinder, a movable abutment subject to the opposing pressures of a spring and of the fluid in a chamber, valve means subject to the opposing pressures of the fluid in said chamber and of the fluid in the brake cylinder and operative on a reduction in the pressure of the fluid in said last-named chamber to open a communication through which fluid may be released from the brake cylinder, valve means controlled by said last-named abutment and controlling a passage through which fluid may be released from the chamber associated therewith, and common means to vary the force exerted by said springs on said abutments.

13. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in a supply passage and operative on a reduction in the pressure of the fluid in said chamber to establish communication between said supply passage and the brake cylinder, a valve controlled by said abutment and controlling a communication through which fluid may be released from said chamber, a movable abutment subject to the opposing pressures of a spring and of the fluid in a chamber, valve means subject to the opposing pressures of the fluid in said chamber and of the fluid in the brake cylinder and operative on a reduction in the pressure of the fluid in said last-named chamber to open a communication through which fluid may be released from the brake cylinder, valve means controlled by said last-named abutment and operative on movement of said abutment by the spring associated therewith to cut off the release of fluid from said chamber, and common means to vary the force exerted by the said springs on said abutments.

14. In a fluid pressure brake, a brake cylinder, and a brake valve device controlling the supply of fluid under pressure to and the release of fluid under pressure from the brake cylinder, the brake valve device comprising a movable abutment subject to the opposing pressures of the fluid supplied to the brake cylinder and of a spring, a valve subject to the opposing pressures of the fluid in a chamber and of the fluid in the supply passage and operative on a reduction in the pressure of the fluid in said chamber to establish communication between said supply passage and the brake cylinder, a valve controlled by said abutment and controlling a communication through which fluid may be released from said chamber, a movable abutment subject to the opposing pressures of a spring and of the fluid in a chamber, valve means subject to the opposing pressures of the fluid in said chamber and of the fluid in the brake cylinder and operative on a reduction in the pressure of the fluid in said last-named chamber to open a communication through which fluid may be released from the brake cylinder, valve means controlled by said last-named abutment and controlling a passage through which fluid may be released from the chamber associated therewith, said valve means being operated to release fluid from said chamber on movement of the abutment by fluid in said chamber, and common means to vary the force exerted by said springs on said abutments.

JOSEPH C. McCUNE.